(12) United States Patent
Yoshinaga

(10) Patent No.: US 12,495,763 B2
(45) Date of Patent: Dec. 16, 2025

(54) ANIMAL TOILET

(71) Applicant: DAIKI CO., LTD., Tokyo (JP)

(72) Inventor: Junji Yoshinaga, Tokyo (JP)

(73) Assignee: DAIKI CO., LTD., Tokyo (JP)

(*) Notice: Subject to any disclaimer, the term of this patent is extended or adjusted under 35 U.S.C. 154(b) by 0 days.

(21) Appl. No.: 18/766,062

(22) Filed: Jul. 8, 2024

(65) Prior Publication Data

US 2024/0357992 A1 Oct. 31, 2024

Related U.S. Application Data

(63) Continuation of application No. PCT/JP2022/034010, filed on Sep. 12, 2022.

(30) Foreign Application Priority Data

Jan. 14, 2022 (JP) .................................. 2022-004029

(51) Int. Cl.
*A01K 1/01* (2006.01)
*A01K 1/015* (2006.01)

(52) U.S. Cl.
CPC .......... *A01K 1/0114* (2013.01); *A01K 1/0155* (2013.01)

(58) Field of Classification Search
CPC .............................. A01K 1/0114; A01K 1/0155
See application file for complete search history.

(56) References Cited

U.S. PATENT DOCUMENTS

| 4,444,148 | A | * | 4/1984 | Lander | ................. | A01K 1/0155 |
| | | | | | | 4/300.3 |
| 5,579,721 | A | * | 12/1996 | O'Toole | ............... | A01K 1/0114 |
| | | | | | | 119/166 |
| 5,996,533 | A | * | 12/1999 | Gordon | .................. | A01K 1/011 |
| | | | | | | 119/166 |
| 2011/0011347 | A1 | * | 1/2011 | Ohlman | ............... | A01K 1/0114 |
| | | | | | | 119/167 |
| 2013/0213311 | A1 | | 8/2013 | Matsuo et al. | | |
| 2017/0273273 | A1 | * | 9/2017 | Chou | .................... | A01K 1/0114 |

(Continued)

FOREIGN PATENT DOCUMENTS

JP S635466 Y2 * 2/1988
JP 2003-180182 A 7/2003

(Continued)

OTHER PUBLICATIONS

Machine Translation of JP-S635466-Y2, Feb. 15, 1988 (Year: 1988).*

(Continued)

*Primary Examiner* — Kimberly S Berona
*Assistant Examiner* — Katherine June Walter
(74) *Attorney, Agent, or Firm* — Oliff PLC

(57) ABSTRACT

An animal toilet includes a body portion, and a partition portion. The body portion receives excreted urine. The partition portion divides the internal space of the body portion into an upper space and a lower space. The partition portion has a plurality of through holes allowing the urine to pass therethrough. The plurality of through holes include a first through hole, and a second through hole. The second through hole is located higher than the first through hole. The opening area of the first through hole is larger than the opening area of the second through hole.

17 Claims, 10 Drawing Sheets

(56) References Cited

U.S. PATENT DOCUMENTS

| | | | |
|---|---|---|---|
| 2018/0344102 A1 | 12/2018 | Ito | |
| 2018/0359987 A1* | 12/2018 | Kaneko | A01K 1/0107 |
| 2019/0373842 A1* | 12/2019 | Urata | A01K 1/0157 |

FOREIGN PATENT DOCUMENTS

| | | | | |
|---|---|---|---|---|
| JP | 2012-005440 A | | 1/2012 | |
| JP | 2012-100577 A | | 5/2012 | |
| KR | 20210031342 A | * | 3/2021 | A01K 1/0114 |
| WO | WO-2011080853 A1 | * | 7/2011 | A01K 1/0107 |
| WO | 2017/149645 A1 | | 9/2017 | |

OTHER PUBLICATIONS

Machine Translation of KR-20210031342-A, Park Chan, Mar. 19, 2021 (Year: 2021).*

Nov. 22, 2022 International Search Report issued in International Patent Application No. PCT/JP2022/034010.

Nov. 22, 2022 Written Opinion issued in International Patent Application No. PCT/JP2022/034010.

* cited by examiner

ANIMAL TOILET

CROSS REFERENCE TO RELATED APPLICATION

This is a Continuation of International Application No. PCT/JP2022/034010 filed Sep. 12, 2022, which claims the benefit of Japanese Application No. 2022-004029 filed Jan. 14, 2022. The contents of these applications are hereby incorporated by reference in their entirety.

TECHNICAL FIELD

The present invention relates to an animal toilet.

BACKGROUND ART

A conventional animal toilet is disclosed, for example, in Patent Document 1. The animal toilet disclosed in Patent Document 1 includes a body portion (tray) that receives excreted urine, and a partition portion (drainboard) that is disposed in the body portion. The internal space of the body portion is divided into an upper space and a lower space by the partition portion. A through hole that allows urine to pass therethrough is formed in the partition portion. A plurality of low water absorptive grains are laid in the upper space. A water-absorbing sheet is disposed in the lower space. Urine excreted in the body portion moves from the upper space to the lower space via the through hole after passing through gaps between the grains. The urine having moved to the lower space accumulates in the lower space in a state of being absorbed by the water-absorbing sheet.

CITATION LIST

Patent Document
  Patent Document 1: JP 2003-180182 A

SUMMARY OF INVENTION

Technical Problem

In the animal toilet described above, enlarging the opening area of the through hole is advantageous for smoothly moving urine from the upper space to the lower space. However, if the opening area of the through hole is enlarged, an odor generated from the urine accumulating in the lower space becomes more likely to leak into the upper space via the through hole. This causes a malodor drifting outside the animal toilet.

Solution to Problem

The present invention has been made in view of the above-described problem, and it is an object thereof to provide an animal toilet that is suitable for smoothly moving urine from an upper space to a lower space while restraining an odor from leaking from the lower space to the upper space.

An animal toilet according to the present invention includes: a body portion that receives excreted urine; and a partition portion that has a plurality of through holes allowing the urine to pass therethrough, and divides an internal space of the body portion into an upper space and a lower space, wherein the plurality of through holes include a first through hole, and a second through hole that is located higher than the first through hole, and an opening area of the first through hole is larger than an opening area of the second through hole.

In this animal toilet, the partition portion is provided with the first and second through holes. The second through hole is located higher than the first through hole. Moreover, the opening area of the first through hole is larger than the opening area of the second through hole. By enlarging the opening area of the first through hole located at a relatively low position in this way, it becomes easier for urine to smoothly move from the upper space to the lower space. Besides, by reducing the opening area of the second through hole located at a relatively high position, an odor generated from urine accumulating in the lower space becomes less likely to leak into the upper space.

Advantageous Effects of Invention

According to the present invention, it is possible to implement an animal toilet that is suitable for smoothly moving urine from an upper space to a lower space while restraining an odor from leaking from the lower space to the upper space.

DESCRIPTION OF EMBODIMENTS

Figure 1:
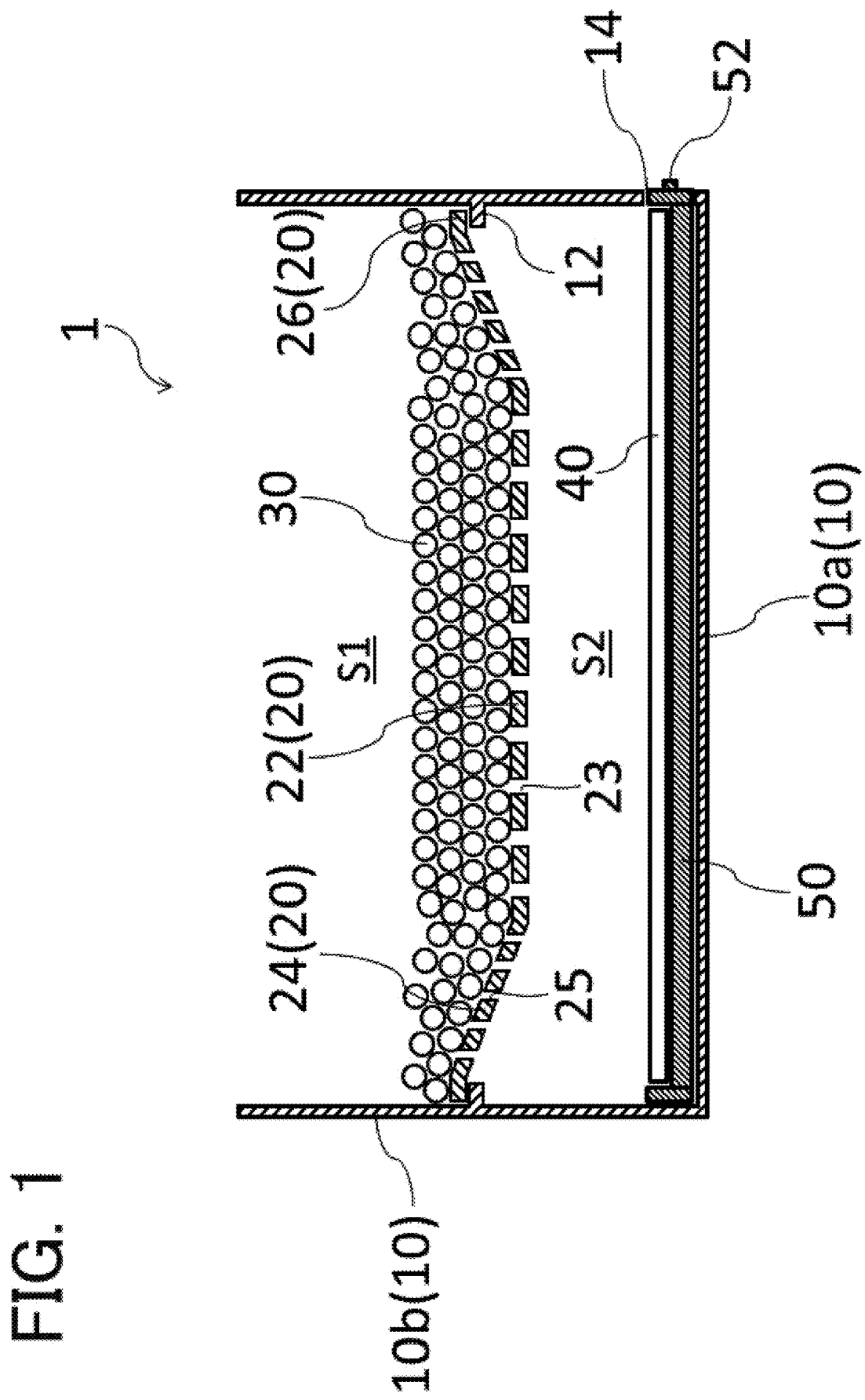
FIG. 1 is an end view showing an embodiment of an animal toilet according to the present invention.

Hereinafter, an embodiment of the present invention will be described in detail with reference to the drawings. In the description of the drawings, the same elements are given the same reference numerals, and a redundant description will be omitted.

FIG. 1 is an end view showing an embodiment of an animal toilet according to the present invention. Referring to FIG. 1, an outline of the constitution of an animal toilet 1 will be described. The animal toilet 1 includes a body portion 10, a partition portion 20, a plurality of grains 30, a water-absorbing sheet 40, and a drawer portion 50. The body portion 10 is composed of one container, and has a bottom face part 10a and a side face part 10b. The body portion 10 receives excreted urine. The outer shape of the body portion 10 is an approximately rectangular parallelepiped shape. As a material of the body portion 10, for example, plastic such as polypropylene or polyethylene can be used.

The body portion 10 has a support part 12. The support part 12 projects from the side face part 10b toward the inside of the body portion 10. The support part 12 supports the partition portion 20 from below. The support part 12 is composed, for example, of a projected rim or a projection. The support part 12 may be formed integrally with the side face part 10b, or may be attached to the side face part 10b after being formed separately from the side face part 10b.

The partition portion 20 is placed on the support part 12. However, the partition portion 20 is not fixed to the body portion 10. The partition portion 20 is detachable relative to the body portion 10. The partition portion 20 is composed of a plate-shaped member. The partition portion 20 is disposed at a position apart from both the upper end of the body portion 10 (side face part 10b) and the water-absorbing sheet 40. Thus, the partition portion 20 divides the internal space of the body portion 10 into an upper space S1 and a lower space S2. The upper space S1 is present above the partition portion 20, and is a space in which the plurality of grains 30 are laid. The lower space S2 is present below the partition portion 20, and is a space in which urine accumulates. As a material of the partition portion 20, for example, plastic such as polypropylene or polyethylene can be used.

The partition portion 20 has a plurality of through holes that allow urine to pass therethrough. In the descriptions below, "plurality of through holes" refers to all of the through holes provided in the partition portion 20 unless otherwise indicated. Each of the through holes allows urine to pass therethrough, but does not allow the grain 30 to pass therethrough. The plurality of through holes include a through hole 23 (first through hole), and a through hole 25 (second through hole). In the present embodiment, the plurality of through holes are composed only of the through hole 23 and the through hole 25. The through hole 25 is located higher than the through hole 23. That is, the distance from the through hole 25 to the bottom face part 10a is larger than the distance from the through hole 23 to the bottom face part 10a. The partition portion 20 has a plurality of the through holes 23, and a plurality of the through holes 25. The number of the through holes 23 is preferably between 30% and 70% inclusive, and more preferably between 40% and 60% inclusive of the total number of the through holes 23 and the through holes 25.

The plurality of grains 30 for treating excrement (mainly urine) are laid in the upper space S1 (on the partition portion 20). Each grain 30 is in a granular shape. Examples of the granular shape include a sphere, column, and ellipsoid. The particle diameter of each grain 30 is, for example, between 5 mm and 20 mm inclusive. As used herein, the particle diameter of the grain 30 is defined as the diameter of the minimum sphere that can include the grain 30. When the animal toilet 1 is used, the grains 30 directly receive excreted urine.

The grains 30 have a hydrophobic property. That is, the grains 30 have the property of not absorbing liquid such as urine at all, or hardly absorbing it. The grains 30 having the hydrophobic property require the liquid passing rate of 60% or more measured by the following test. First, approximate 50 grams of the grains 30 (sample) are placed in a sieve with the inner diameter of 10 cm and the mesh size of 1 mm. An empty beaker is set under the sieve. Then, 30 ml of water is dripped on the sample over 10 seconds using a syringe with the inner diameter of its outer cylinder of 3 cm and the inner diameter of its cylinder tip of 4 mm (60 ml syringe manufactured by Terumo Corp.). After waiting 1 minute, the quantity of the water in the beaker is measured. The ratio of the measured water quantity with respect to the quantity of the dripped water (30 ml) shall be the liquid passing rate. At this time, if the water quantity in the beaker is 18 ml or more, the liquid passing rate is 60% or more, and therefore the grains 30 are found to have the hydrophobic property.

Each grain 30 preferably contains an organic substance as its main material. As used herein, the main material of the grain 30 refers to the material that accounts for the highest weight ratio in the grain 30, out of one or more materials constituting the grain 30. Examples of the organic substance include papers, used tea leaves, plastics, and bean curd lees. Each grain 30 may be made only of an organic substance, or may be made of an organic substance and an inorganic substance.

The papers refer to a material composed mainly of pulp. Examples of the papers include, in addition to ordinary paper, a vinyl chloride wallpaper classified product, photographic paper, release paper, fluff pulp, papermaking sludge, and pulp sludge. The vinyl chloride wallpaper classified product is obtained by removing part of polyvinyl chloride from vinyl chloride wallpaper containing paper and polyvinyl chloride. Examples of the plastics include, in addition to ordinary plastic, an aluminum deposited film, and a disposable diaper classified product (plastic obtained by classifying disposable diapers). The bean curd lees are preferably dried bean curd lees. These materials may be, or may not be subjected to hydrophobic treatment (water repellency treatment).

The material(s) constituting the grain 30 may be only one material, or two or more materials. In the former case, the main material described above is the only material constituting the grain 30. In the latter case, the grain 30 is made of a mixture of the main material and other material(s). Examples of the other material include gypsum and baking soda. Adding gypsum or baking soda can enhance the hydrophobic property of the grain 30. The ratio of gypsum or baking soda is, for example, 5 wt. % or more and less than 50 wt. % with respect to the entirety of the grain 30.

The grains 30 can be manufactured by, for example, the following method. First, granules that will serve as the grains 30 are formed by granulating a granulating material (the material(s) constituting the grains 30) with a granulation apparatus. As the granulation apparatus, for example, an extrusion granulator can be used. The granules may be subjected to hydrophobic treatment as needed. The hydrophobic treatment can be performed by, for example, coating the surfaces of the granules with a hydrophobic agent (water repellent agent). In the case where the hydrophobic treatment is not performed, it is preferable that crevices are prevented from forming in the granules as much as possible by increasing the pressure that is applied to the granulating material during granulation. This is because the crevices serve as a path through which liquid such as urine enters inside the grains 30. Prior to the granulation, pretreatment such as pulverization, kneading, and adding water is performed on the granulating material as needed. Also, after the granulation, posttreatment such as sieving (sizing), and drying is performed as needed.

The water-absorbing sheet 40 is disposed in the lower space S2 (under the partition portion 20). The water-absorbing sheet 40 absorbs urine that has passed through the through holes of the partition portion 20. That is, the urine having passed through the through holes accumulates in the lower space S2 in a state of being absorbed by the water-absorbing sheet 40.

The drawer portion 50 is capable of being inserted in and extracted from the body portion 10 through an opening 14 formed in the side face part 10b. The drawer portion 50 houses the water-absorbing sheet 40. That is, the water-absorbing sheet 40 is disposed in the body portion 10 in the state of being housed in the drawer portion 50. As a material of the drawer portion 50, for example, plastic such as polypropylene or polyethylene can be used.

When the animal toilet 1 is used, urine excreted on the grains 30 flows downward, passing through gaps between the grains 30. The urine moves from the upper space S1 to the lower space S2 via the through holes of the partition portion 20, and then is absorbed by the water-absorbing sheet 40.

Figure 2:
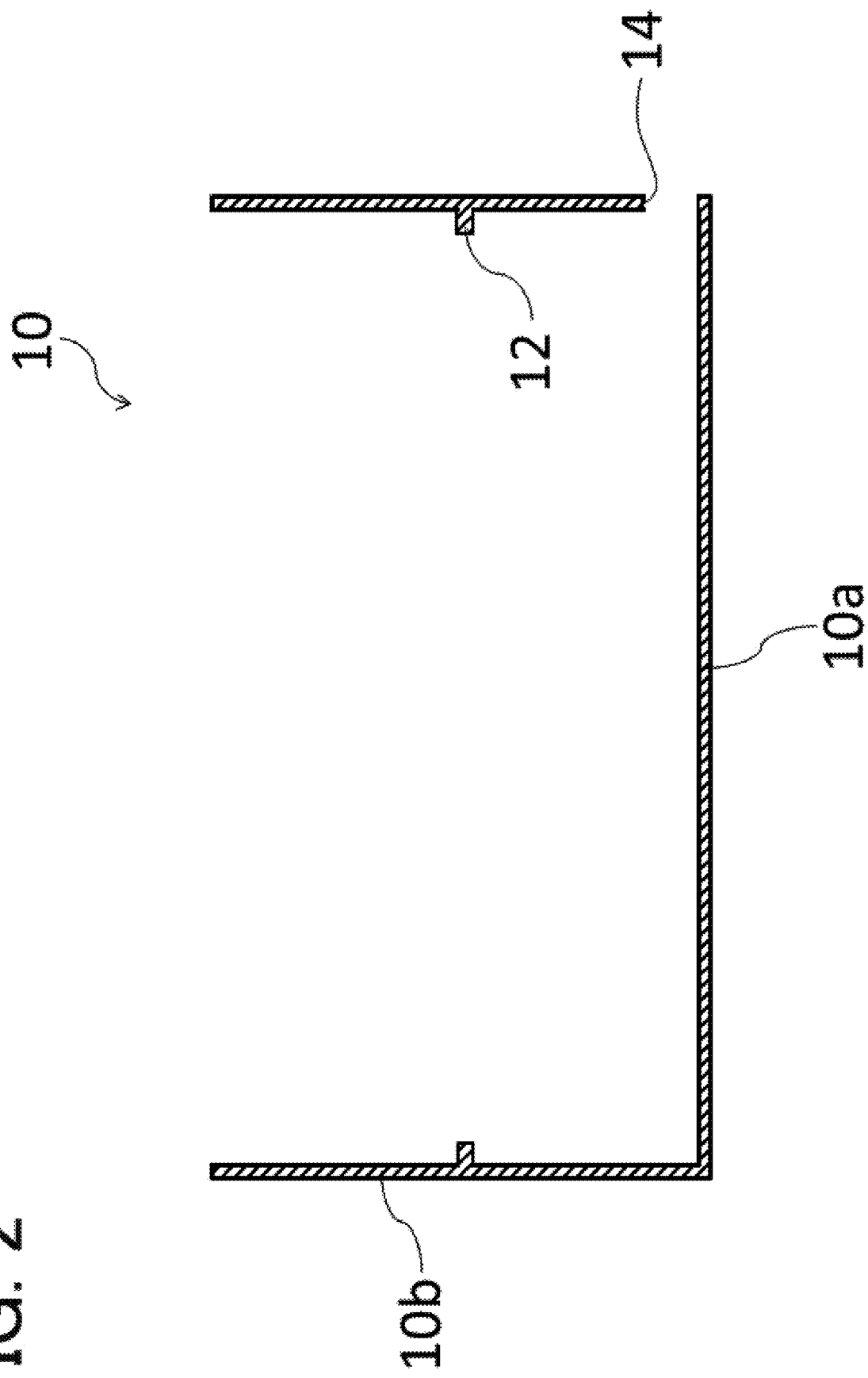
FIG. 2 is an end view showing a body portion 10.
Figure 3:
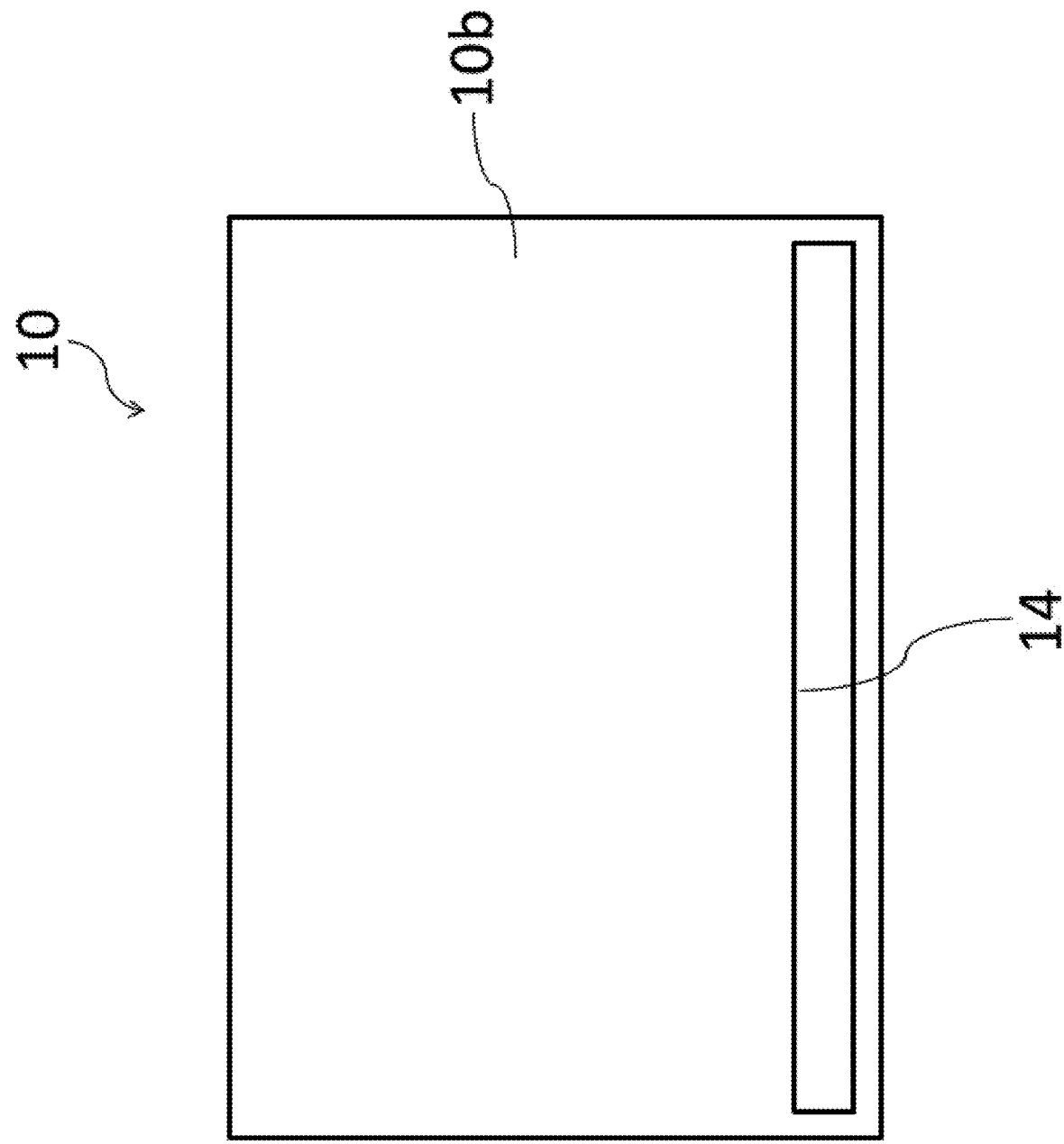
FIG. 3 is a front view showing the body portion 10.

Hereinafter, referring to FIG. 2 to FIG. 8, the constitution of each portion of the animal toilet 1 will be described in detail. FIG. 2 and FIG. 3 are, respectively, an end view and a front view showing the body portion 10. The opening 14 for inserting and extracting the drawer portion 50 is formed in the side face part 10b of the body portion 10. The opening 14 is located near the bottom face part 10a, and in a horizontally long rectangular shape. The length in the horizontal direction (right/left direction in FIG. 3) of the opening 14 is nearly equal to the breadth (inner size) of the body portion 10, and is, for example, between 20 cm and 40 cm inclusive. The length in the vertical direction (top/bottom direction in FIG. 3) of the opening 14 is, for example, between 2 cm and 5 cm inclusive.

Figure 4:
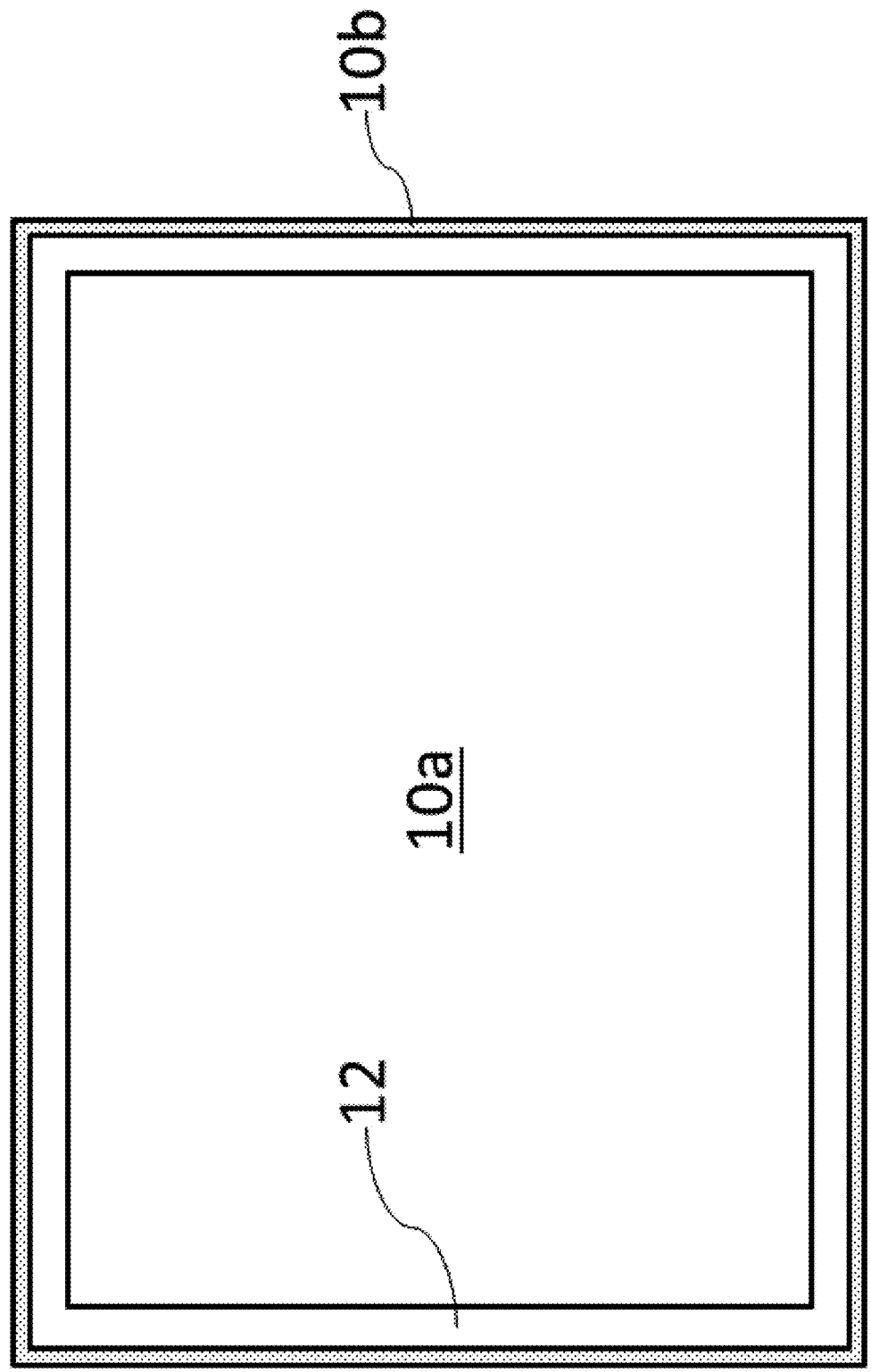
FIG. 4 is a plane view showing the body portion 10.

FIG. 4 is a plane view showing the body portion 10. The support part 12 is provided over the entirety of the inner periphery of the side face part 10b in a plane view. That is, the support part 12 is composed of a projected rim that is provided annularly along the inner periphery of the side face part 10b. The inner periphery of the side face part 10b has an approximately rectangular shape in a plane view. As used herein, "approximately rectangular shape" means that the shape includes not only a rectangle but also a shape similar to a rectangle such as a round corner rectangle. The projecting length of the support part 12 (the length in the direction perpendicular to the inner surface of the side face part 10b provided with the support part 12) is, for example, between 5 mm and 15 mm inclusive.

Figure 5:
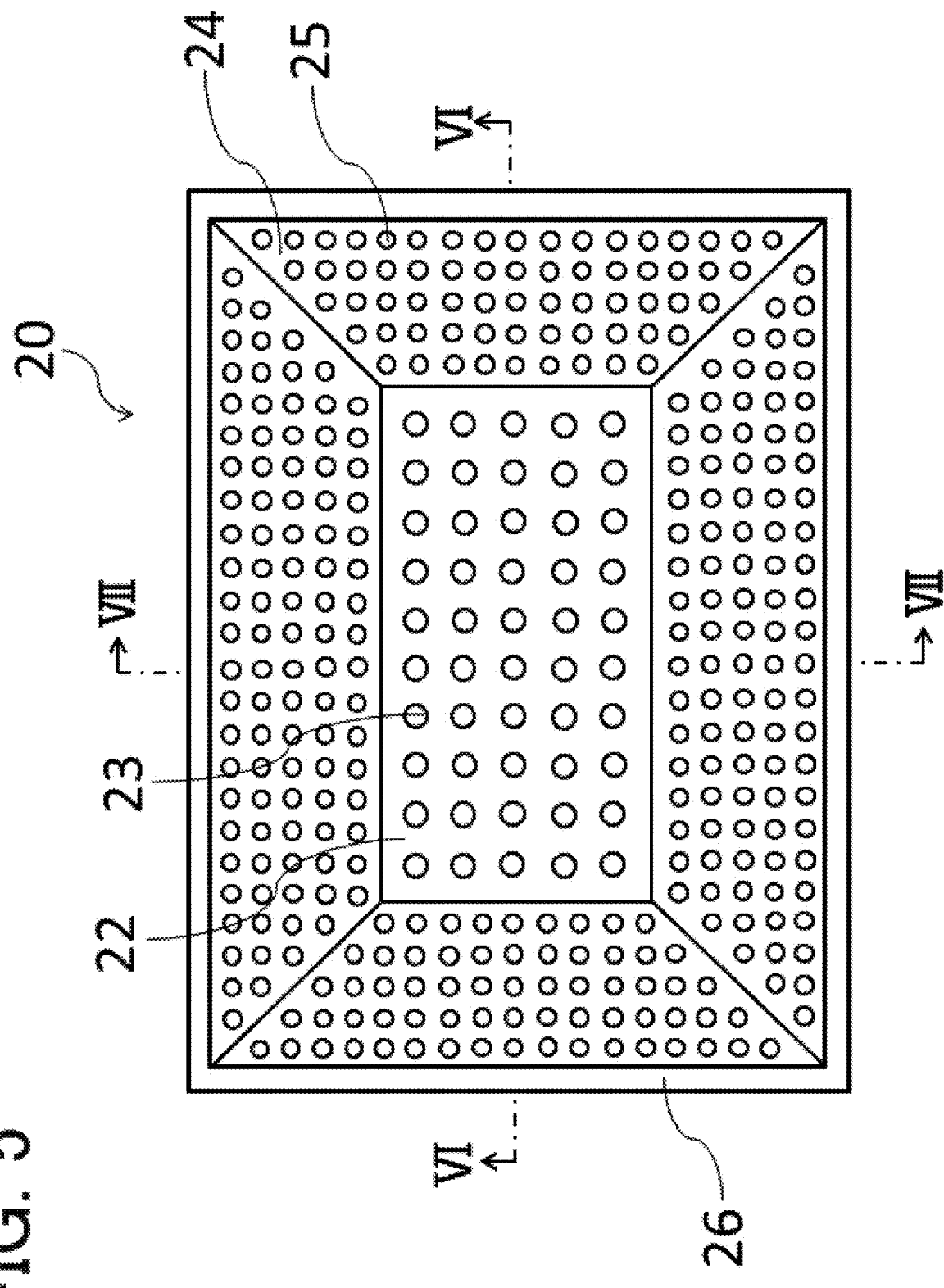
FIG. 5 is a plane view showing a partition portion 20.
Figure 6:
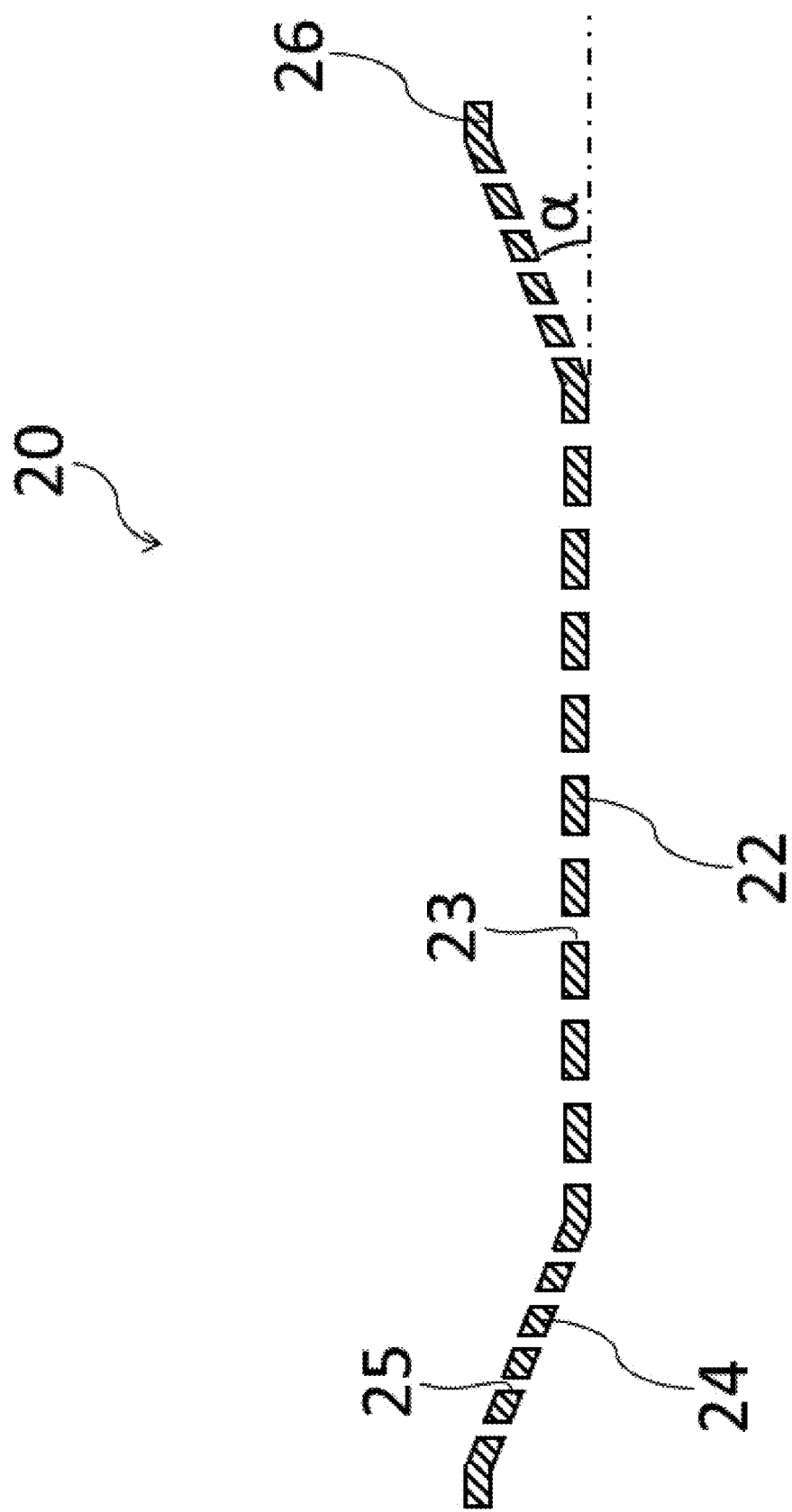
FIG. 6 is an end view taken along line VI-VI in FIG. 5.
Figure 7:
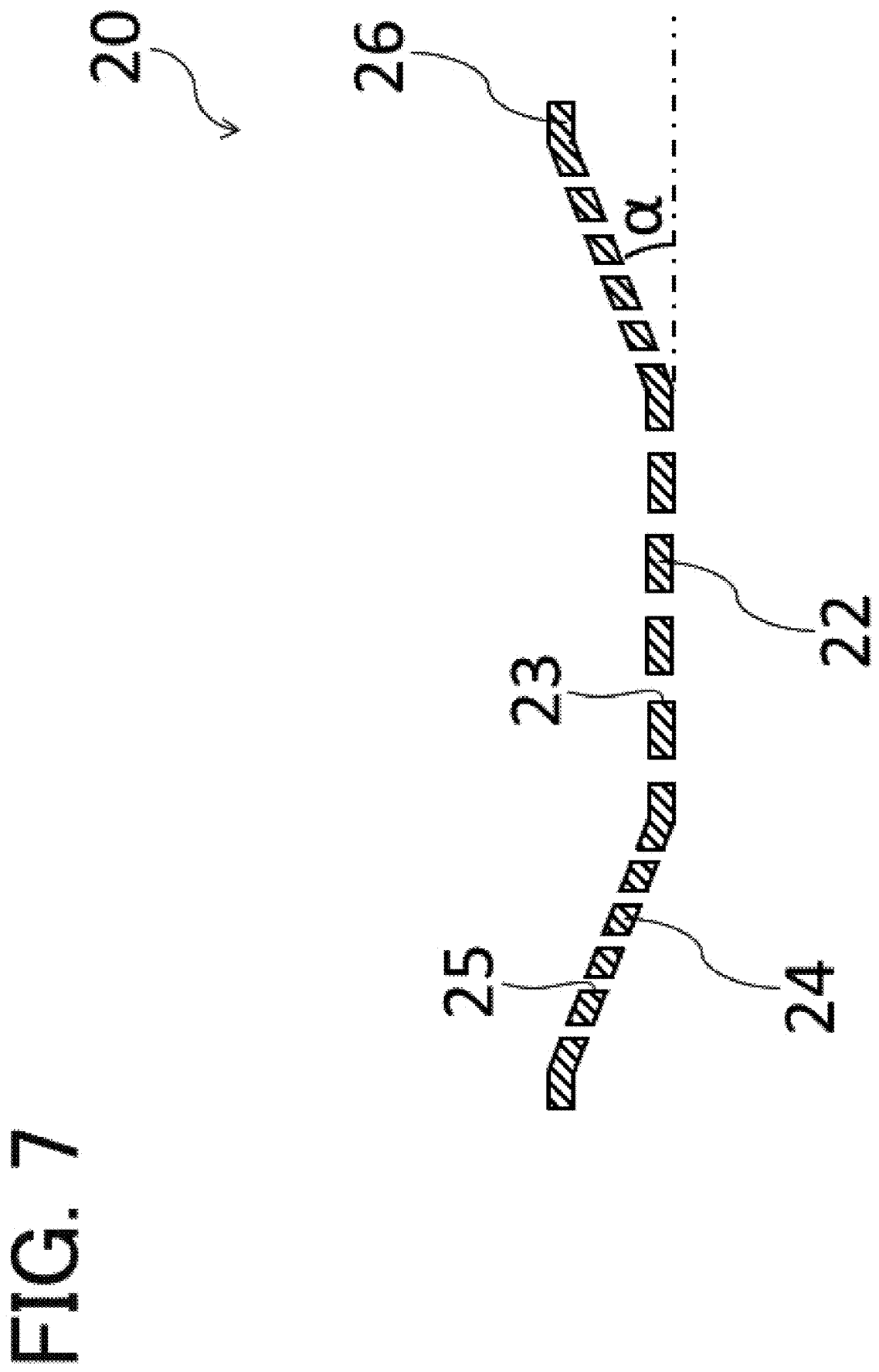
FIG. 7 is an end view taken along line VII-VII in FIG. 5.

FIG. 5 is a plane view showing the partition portion 20. Also, FIG. 6 and FIG. 7 are end views taken along line VI-VI and line VII-VII in FIG. 5, respectively. The partition portion 20 is capable of being disposed in the body portion 10 in a state in which the entire periphery of the partition portion 20 is apart from the side face part 10b. The partition portion 20 has an approximately rectangular shape in a plane view. The partition portion 20 has a bottom part 22, an inclining part 24, and a rim part 26.

The bottom part 22 is located in a central part of the partition portion 20 in a plane view. The area ratio of the bottom part 22 with respect to the partition portion 20 in a plane view is preferably between 20% and 60% inclusive, and more preferably between 30% and 50% inclusive. The bottom part 22 is in a rectangular flat plate shape, and constitutes the bottom face of the partition portion 20. The partition portion 20 is disposed in the body portion 10 such that the bottom part 22 is horizontal. The bottom part 22 is provided with the plurality of through holes 23. In the present embodiment, all through holes 23 are present in the bottom part 22. The plurality of through holes 23 are arranged in a lattice pattern in the bottom part 22. The plane shape of each through hole 23 is a circle. Each through hole 23 has a shape obtained by piercing the bottom part 22 with a column having a center axis parallel with the height direction of the body portion 10 (the direction perpendicular to the paper surface of FIG. 5).

The inclining part 24 is located around the bottom part 22. Specifically, the inclining part 24 is composed of four parts. The four parts of the inclining part 24 are connected, respectively, to the four sides of the bottom part 22. Each part of the inclining part 24 has a trapezoidal flat plate shape. As can be seen from FIG. 6 and FIG. 7, the inclining part 24 inclines downward toward the bottom part 22. The inclination angle α of the inclining part 24 is preferably between 10° and 50° inclusive, and more preferably between 20° and 40° inclusive. The inclining part 24 is provided with the plurality of through holes 25. In the present embodiment, all through holes 25 are present in the inclining part 24. The plurality of through holes 25 are arranged in a lattice pattern in the inclining part 24. The plane shape of each through hole 25 is a circle. Each through hole 25 has a shape obtained by piercing the inclining part 24 with a column having a center axis parallel with the height direction of the body portion 10.

The opening area of each through hole 23 is larger than the opening area of each through hole 25. As used herein, the opening area is defined as the area of the opening part of each through hole 23, 25 in a plane view (see FIG. 5). The opening area of each through hole 23 is preferably twice or more, and more preferably four times or more of the opening area of each through hole 25.

The rim part 26 is located around the inclining part 24, and constitutes the rim of the partition portion 20. The rim part 26 does not incline, and is provided in parallel with the bottom part 22. The rim part 26 is a part that is placed on the support part 12 of the body portion 10. The lower end of the inclining part 24 is connected to the bottom part 22, and the upper end of the inclining part 24 is connected to the rim part 26. The inclining part 24 inclines downward from the rim part 26 toward the bottom part 22. Note that no through hole is formed in the rim part 26.

Figure 8:
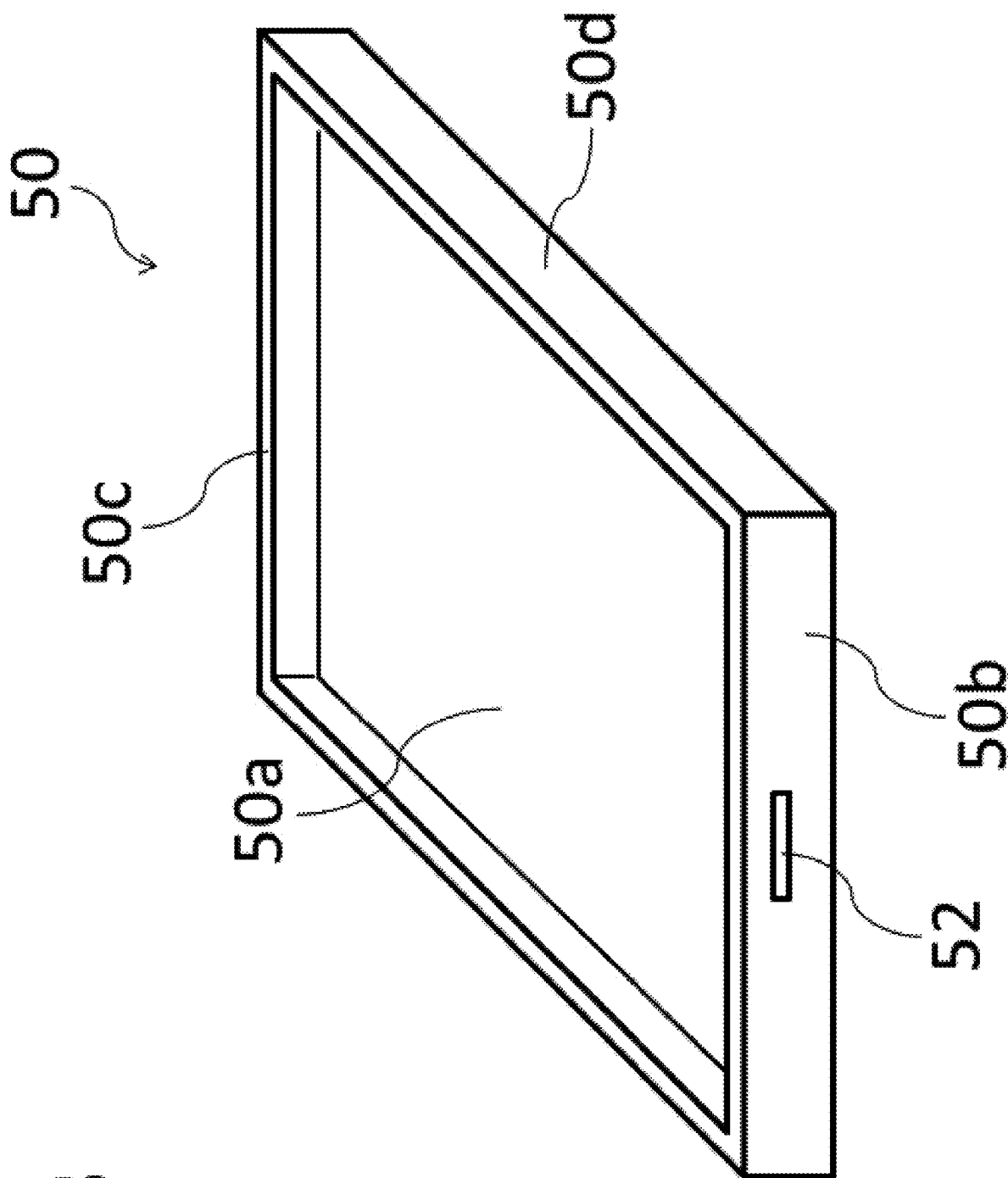
FIG. 8 is a perspective view showing a drawer portion 50.

FIG. 8 is a perspective view showing the drawer portion 50. The drawer portion 50 has a bottom board 50a, a front board 50b, a rear board 50c, and a pair of side boards 50d. The size of the bottom board 50a is nearly equal to the size of the bottom face part 10a of the body portion 10. The front board 50b has nearly the same shape and size as the opening 14. A grip 52 is attached to the front board 50b.

The effects of the animal toilet 1 will be described. In the animal toilet 1, the partition portion 20 is provided with the through hole 23 and the through hole 25. The through hole 25 is located higher than the through hole 23. Moreover, the opening area of the through hole 23 is larger than the opening area of the through hole 25. By enlarging the opening area of the through hole 23 located at a relatively low position in this way, it becomes easier for urine to smoothly move from the upper space S1 to the lower space S2. That is because urine is more likely to pass through the through hole located at a relatively low position (through hole 23) than the through hole located at a relatively high position (through hole 25) due to urine having a property of flowing downward. Besides, by reducing the opening area of the through hole 25 located at a relatively high position, an odor generated from urine accumulating in the lower space S2 becomes less likely to leak into the upper space S1. That is because an odor is more likely to pass through the through hole located at a relatively high position (through hole 25) than the through hole located at a relatively low position (through hole 23) due to an odor having a property of rising. Accordingly, the animal toilet 1 is implemented that is suitable for smoothly moving urine from the upper space S1 to the lower space S2 while restraining an odor from leaking from the lower space S2 to the upper space S1.

From the viewpoint of smoothly moving urine while restraining an odor from leaking, the opening area of the through hole 23 is preferably twice or more, and more preferably four times or more of the opening area of the through hole 25. On the other hand, if the ratio is too large, the possible range of designing the opening area of each through hole 23, 25 becomes narrower, which may hinder manufacturing of the animal toilet 1. From this viewpoint, the opening area of the through hole 23 is preferably eight times or less of the opening area of the through hole 25.

The partition portion 20 has the bottom part 22 and the inclining part 24. By providing the inclining part 24 in this way, urine can be centralized in a part (bottom part 22) of the partition portion 20. Thus, urine can efficiently move from the upper space S1 to the lower space S2.

The bottom part 22 is provided with the through hole 23. Thus, it is possible to make urine unlikely to stay on the bottom part 22 of the partition portion 20. Moreover, the inclining part 24 is provided with the through hole 25. Thus, it is also possible to make urine unlikely to stay on the inclining part 24 of the partition portion 20.

The bottom part 22 is located in a central part of the partition portion 20, and the inclining part 24 is located around the bottom part 22. An odor generated from urine accumulating in the lower space S2 tends to rise especially along the side face part 10b of the body portion 10. For this reason, by disposing the inclining part 24 provided with the through hole 25 having a relatively small opening area in the vicinity of the side face part 10b, an odor can be efficiently restrained from leaking from the lower space S2 to the upper space S1.

Enlarging the area of the bottom part 22 is advantageous for smoothly moving urine from the upper space S1 to the lower space S2. From this viewpoint, the area ratio of the bottom part 22 with respect to the partition portion 20 in a plane view is preferably 20% or more, and more preferably 30% or more. On the other hand, if the area of the bottom part 22 is too large, an odor becomes more likely to leak from the lower space S2 to the upper space S1. From this viewpoint, the above-described area ratio is preferably 60% or less, and more preferably 50% or less.

Increasing the number of the through holes 23 is advantageous for smoothly moving urine from the upper space S1 to the lower space S2. From this viewpoint, the number of the through holes 23 is preferably 30% or more, and more preferably 40% or more of the total number of the through holes 23 and the through holes 25. On the other hand, if the number of the through holes 23 is too large, an odor becomes more likely to leak from the lower space S2 to the upper space S1. From this viewpoint, the number of the through holes 23 is preferably 70% or less, and more preferably 60% or less of the total number of the through holes 23 and the through holes 25.

Enlarging the inclination angle $\alpha$ of the inclining part 24 facilitates urine to flow on the inclining part 24. From this viewpoint, the inclination angle $\alpha$ is preferably between 10° or more, and more preferably 20° or more. On the other hand, if the inclination angle $\alpha$ is too large, the grains 30 become more difficult to lay on the inclining part 24 stably. From this viewpoint, the inclination angle $\alpha$ is preferably between 50° or less, and more preferably 40° or less.

The body portion 10 is composed of one container. In this case, it is possible to implement the animal toilet 1 including the upper space S1 and the lower space S2 with simple constitution, compared to a case where the body portion 10 is composed of a plurality of containers.

The support part 12 is provided over the entirety of the inner periphery of the side face part 10b in a plane view. Thus, it is possible to make a situation less likely to occur in which the partition portion 20 falls into the lower space S2.

The partition portion 20 is capable of being disposed in the body portion 10 in the state in which the entire periphery thereof is apart from the side face part 10b. By providing a margin between the partition portion 20 and the side face part 10b in this way, the partition portion 20 can be attached to and detached from the body portion 10 easily.

The partition portion 20 is not fixed to the body portion 10. In this case, the partition portion 20 can be attached to and detached from the body portion 10 easily.

The partition portion 20 is placed on the support part 12. Thus, the partition portion 20 can stay at a predetermined position in the body portion 10 without being fixed to the body portion 10.

Each grain 30 has a hydrophobic property. In this case, most of urine excreted on the grains 30 is not absorbed by the grains 30, and passes through gaps between the grains 30. Thus, the urine can be quickly guided to the partition portion 20.

In the case where each grain 30 contains an organic substance as its main material, it is possible to obtain the grains 30 suitable for being disposed of by incineration. In this case, the grains 30 after use can easily be disposed of as burnable garbage, which therefore increases convenience for users (owners of an animal etc.). Especially in the case where each grain 30 is made only of an organic substance, it is possible to obtain the grains 30 more suitable for being disposed of by incineration.

The water-absorbing sheet 40 is disposed in the lower space S2. Thus, urine accumulating in the lower space S2 can be confined in the water-absorbing sheet 40. For this reason, it is possible to ease generation of an odor from the urine.

The drawer portion 50 is provided that is capable of being inserted in and extracted from the body portion 10. Thus, it is possible to easily carry out the work of replacing a used water-absorbing sheet 40 with a new one.

The present invention is not limited to the above-described embodiment, and various modifications can be made. In the above-described embodiment, an example is given in which the plane shape of the through hole 23 is a circle. However, the plane shape of the through hole 23 is arbitrary, and may be, for example, an ellipse, or a polygon such as a rectangle. The same shall apply to the plane shape of the through hole 25.

Figure 9:
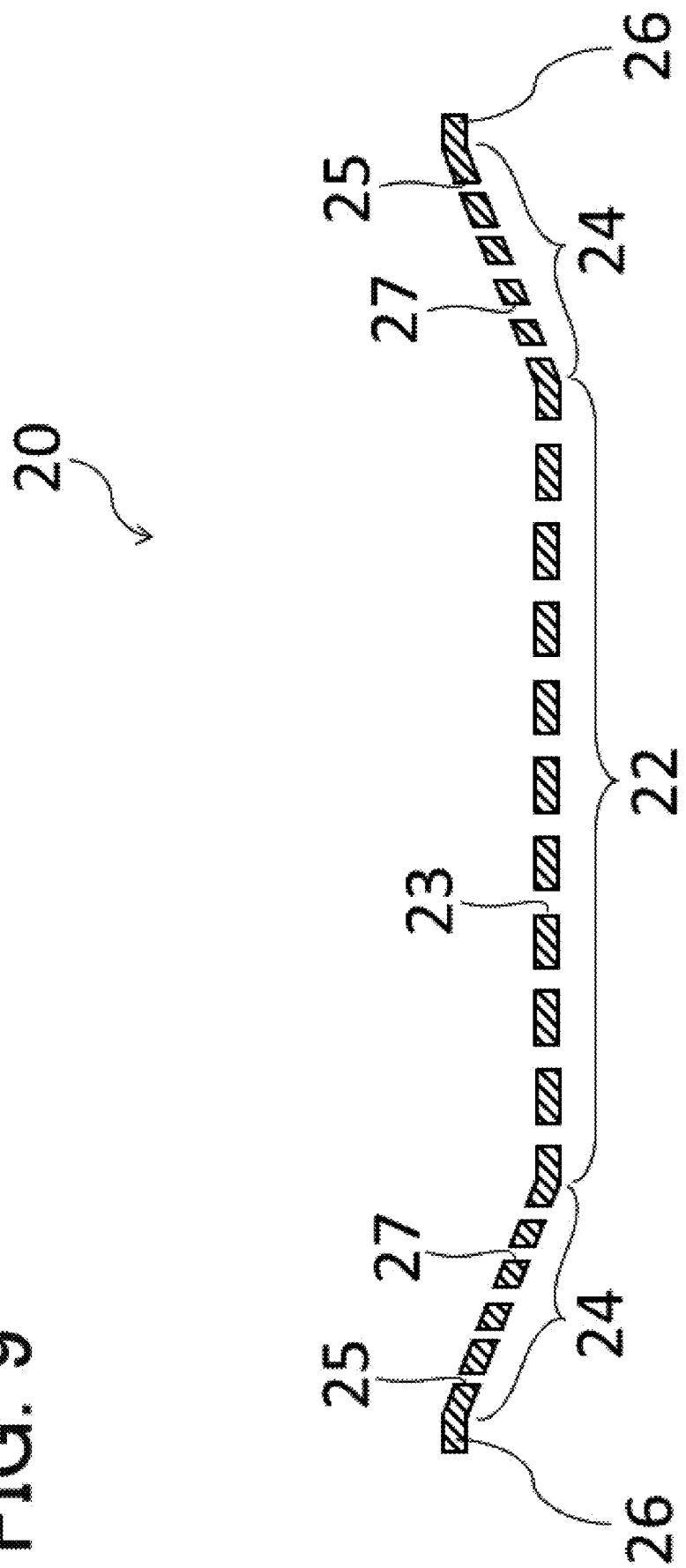
FIG. 9 is an end view showing the partition portion 20 according to a modified example.

In the above-described embodiment, an example is given in which the partition portion 20 is provided with two types of through holes having mutually different opening areas (the through hole 23 and the through hole 25). However, the partition portion 20 may include three or more types of through holes having mutually different opening areas as shown, for example, in FIG. 9. In FIG. 9, the partition portion 20 includes a through hole 27 (third through hole) in addition to the through hole 23 and the through hole 25. The through hole 27 is located higher than the through hole 23 and lower than the through hole 25. The opening area of the through hole 27 is smaller than the opening area of the through hole 23 and larger than the opening area of the through hole 25. The partition portion 20 includes a plurality of the through holes 27. In this example, all through holes 27 are present in the inclining part 24. In detail, the through holes 25 are provided in a region of the inclining part 24 relatively far from the bottom part 22, and the through holes 27 are provided in another region of the inclining part 24 relatively near to the bottom part 22.

In the above-described embodiment, an example is given in which the drawer portion 50 is provided. However, it is not essential to provide the drawer portion 50. In the case where the drawer portion 50 is not provided, the water-absorbing sheet 40 is disposed directly on the bottom face part 10a. In that case, the side face part 10b is not provided with the opening 14 naturally.

In the above-described embodiment, an example is given in which the water-absorbing sheet 40 is disposed in the body portion 10. However, it is not essential to dispose the water-absorbing sheet 40 in the body portion 10. In the case where the water-absorbing sheet 40 is not disposed, the drawer portion 50 is also not provided.

Figure 10:
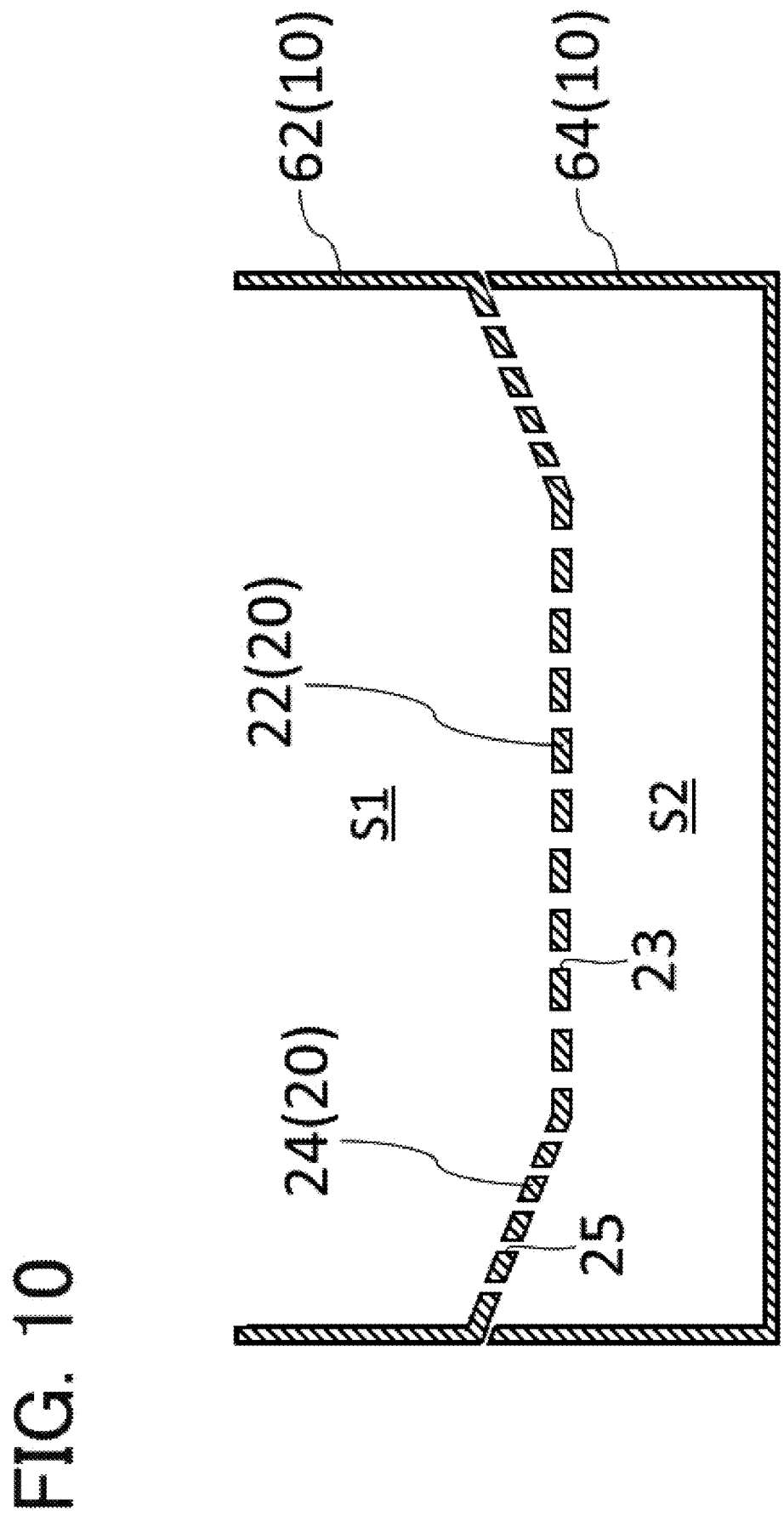
FIG. 10 is a diagram for illustrating a modified example of the animal toilet in FIG. 1.

In the above-described embodiment, an example is given in which the body portion 10 is composed of one container. However, the body portion 10 may be composed of a plurality of containers as shown, for example, in FIG. 10. In FIG. 10, the body portion 10 is composed of two containers (containers 62, 64). Each container 62, 64 has a bottom face part and a side face part, and is in a box shape. The container 62 is put on the container 64. The bottom face part of the container 62 constitutes the partition portion 20 having the bottom part 22 and the inclining part 24. Thus, the internal space of the container 62 and the internal space of the container 64 are, respectively, the upper space S1 and the lower space S2. The side face part of the container 62, and the bottom face part and the side face part of the container 64 constitute the body portion 10.

LIST OF REFERENCE NUMERALS

1 Animal Toilet
10 Body Portion
10a Bottom Face Part
10b Side Face Part
12 Support Part
14 Opening
20 Partition Portion
22 Bottom Part
23 Through Hole (First Through Hole)
24 Inclining Part
25 Through Hole (Second Through Hole)
26 Rim Part
27 Through Hole (Third Through Hole)
30 Grain
40 Water-Absorbing Sheet
50 Drawer Portion
52 Grip
62 Container
64 Container
S1 Upper Space
S2 Lower Space

The invention claimed is:

1. An animal toilet comprising:
a body portion that receives excreted urine; and
a partition portion that has a plurality of through holes allowing the urine to pass therethrough, and divides an internal space of the body portion into an upper space and a lower space, wherein:
the plurality of through holes include a first through hole, and a second through hole that is located higher than the first through hole,
an opening area of the first through hole is larger than an opening area of the second through hole,
the partition portion is a single partition portion that includes both the first through hole and the second through hole,
the partition portion has a bottom part and an inclining part that inclines downward toward the bottom part,
a first length in a horizontal direction of the bottom part is greater than a second length in the horizontal direction of the inclining part,
the first through hole is provided in the bottom part, and the second through hole is provided in the inclining part.

2. The animal toilet according to claim 1, wherein the opening area of the first through hole is twice or more of the opening area of the second through hole.

3. The animal toilet according to claim 1, wherein the bottom part is located in a central part of the partition portion, and
the inclining part is located around the bottom part.

4. The animal toilet according to claim 1, wherein an area ratio of the bottom part with respect to the partition portion in a plane view is between 20% and 60% inclusive.

5. The animal toilet according to claim 1, wherein an inclination angle of the inclining part is between 10° and 50° inclusive.

6. The animal toilet according to claim 1, wherein the partition portion has a plurality of the first through holes, and a plurality of the second through holes.

7. The animal toilet according to claim 6, wherein the number of the first through holes is between 30% and 70% inclusive of the total number of the first and second through holes.

8. The animal toilet according to claim 1, wherein the plurality of through holes include a third through hole that is located higher than the first through hole and lower than the second through hole, and
an opening area of the third through hole is smaller than the opening area of the first through hole and larger than the opening area of the second through hole.

9. The animal toilet according to claim 8, wherein the partition portion has a plurality of the third through holes.

10. The animal toilet according to claim 1, further comprising:
a plurality of grains that are laid in the upper space, and have a hydrophobic property.

11. The animal toilet according to claim 10, wherein each of the grains contains an organic substance as a main material.

12. The animal toilet according to claim 11, wherein each of the grains is made only of an organic substance.

13. The animal toilet according to claim 1, wherein the body portion is composed of one container, and has a bottom face part and a side face part.

14. The animal toilet according to claim 13, wherein the partition portion is not fixed to the body portion.

15. The animal toilet according to claim 14, wherein the body portion has a support part that projects from the side face part toward an inside of the body portion, and
the partition portion is placed on the support part.

16. The animal toilet according to claim 13, further comprising:
a water-absorbing sheet that is disposed in the lower space, and absorbs the urine having passed through the through holes.

17. The animal toilet according to claim 16, further comprising:
a drawer portion that houses the water-absorbing sheet, wherein an opening is formed in the side face part of the body portion, and the drawer portion is capable of being inserted in and extracted from the body portion through the opening.

\* \* \* \* \*